US012459785B2

(12) United States Patent
Madera et al.

(10) Patent No.: US 12,459,785 B2
(45) Date of Patent: Nov. 4, 2025

(54) ELEVATOR SYSTEM

(71) Applicant: TK Elevator Innovation and Operations GmbH, Essen (DE)

(72) Inventors: Martin Madera, Neuhausen (DE); Ionel Stanica, Bucharest (RO); Mike Obert, Gernsbach (DE); Martin Krieg, Gaggenau (DE); Sebastian Griesardt, Bietigheim (DE)

(73) Assignee: TK Elevator Innovation and Operations GmbH, Essen (DE)

( * ) Notice: Subject to any disclaimer, the term of this patent is extended or adjusted under 35 U.S.C. 154(b) by 1299 days.

(21) Appl. No.: 17/250,641

(22) PCT Filed: Aug. 8, 2019

(86) PCT No.: PCT/EP2019/071313
§ 371 (c)(1),
(2) Date: Feb. 15, 2021

(87) PCT Pub. No.: WO2020/035388
PCT Pub. Date: Feb. 20, 2020

(65) Prior Publication Data

US 2021/0171319 A1 Jun. 10, 2021

(30) Foreign Application Priority Data

Aug. 15, 2018 (DE) ......................... 102018213760.9

(51) Int. Cl.
*B66B 9/00* (2006.01)
*B66B 7/02* (2006.01)

(52) U.S. Cl.
CPC ................ *B66B 9/003* (2013.01); *B66B 7/02* (2013.01)

(58) Field of Classification Search
CPC ................................. B66B 7/02; B66B 9/003
See application file for complete search history.

(56) References Cited

U.S. PATENT DOCUMENTS

2011/0042168 A1 2/2011 Grundmann
2014/0190774 A1 7/2014 Hsu et al.
(Continued)

FOREIGN PATENT DOCUMENTS

CN H05132263 A * 5/1993
CN H05310384 A * 11/1993
(Continued)

OTHER PUBLICATIONS

International Search Report in International applicaiton No. PCT/EP2019/071313, dated Nov. 20, 2019.
(Continued)

*Primary Examiner* — Diem M Tran
(74) *Attorney, Agent, or Firm* — Dinsmore & Shohl LLP

(57) ABSTRACT

An elevator system includes a first and second elevator shaft, a first vertical guide rail disposed in the first shaft, a second vertical guide rail disposed in the second shaft, a plurality of elevator cars movable within the shafts along the guide rails, and a repositioning assembly configured to transfer the plurality of elevator cars from the first elevator shaft to the second elevator shaft. The repositioning assembly includes a repositioning track extending between the first and second shafts, and a repositioning carrier that is movable along the repositioning track, and configured to transfer the cars from a first repositioning position in the first elevator shaft to a second repositioning position in the second elevator shaft. The elevator system also includes an adjusting assembly configured to adjust the position of at least one of the first or second repositioning positions at least transversely to the repositioning direction.

20 Claims, 4 Drawing Sheets

(56) References Cited

U.S. PATENT DOCUMENTS

| | | | |
|---|---|---|---|
| 2017/0036889 | A1 | 2/2017 | Ericson |
| 2018/0127242 | A1 | 5/2018 | Witczak et al. |

FOREIGN PATENT DOCUMENTS

| | | | | | |
|---|---|---|---|---|---|
| CN | 101896416 | A | | 11/2010 | |
| CN | 103502133 | A | | 1/2014 | |
| CN | 106395552 | A | | 2/2017 | |
| CN | 106927336 | A | * | 7/2017 | ......... B66B 11/0226 |
| CN | 107458947 | A | * | 12/2017 | ............. B66B 9/003 |
| CN | 108059062 | A | | 5/2018 | |
| CN | 108313855 | A | * | 7/2018 | ............... B66B 1/18 |
| DE | 102015212222 | A1 | | 1/2017 | |
| DE | 102016222837 | A1 | * | 5/2018 | ............... B66B 1/36 |
| EP | 2219985 | B1 | | 2/2013 | |
| EP | 3133038 | A1 | | 2/2017 | |
| EP | 3318526 | A1 | | 5/2018 | |
| JP | H0464587 | A | | 2/1992 | |
| KR | 20220030829 | A | * | 3/2022 | |
| WO | WO-2010022907 | A1 | * | 3/2010 | ............. B61B 13/00 |
| WO | 2012/154178 | A1 | | 11/2012 | |
| WO | WO-2016109338 | A1 | * | 7/2016 | ......... B66B 11/0005 |
| WO | 2017/001332 | A1 | | 1/2017 | |

OTHER PUBLICATIONS

Office Action in priority patent application No. DE 10 2018 213 760.9, dated Apr. 18, 2019.

First Office Action, dated Dec. 6, 2021, in Counterpart Chinese Application No. 201980054227.5, citing the above identified references that have not yet been listed in an IDS in the present application.

* cited by examiner

ELEVATOR SYSTEM

CROSS REFERENCE TO RELATED APPLICATIONS

This application is a U.S. National Stage Entry of International Patent Application Serial Number PCT/EP2019/071313, filed Aug. 8, 2019, which claims priority to German Patent Application No. DE 10 2018 213 760.9, filed Aug. 15, 2018, the entire contents of each of which are incorporated herein by reference.

FIELD

The present disclosure generally relates to an elevator system. More specifically, the present disclosure relates to elevator systems in which a plurality of cars can travel simultaneously in a shared shaft, or in a plurality of shafts, and with the help of a repositioning assembly, the cars can be transferred from a first shaft into a second shaft.

BACKGROUND

European patent no. EP 3 318 526 A1 discloses an elevator system in which a plurality of cars can travel simultaneously in a plurality of shafts, and with the help of a transfer station, the cars can be transferred from a first shaft into a second shaft. In this case, a transfer station comprises a plurality of transfer station modules 162 which can be assembled according to the configuration of the elevator system. Each module of this kind comprises a rail (reference number 176 in FIG. 3) and together these form a repositioning track. A car guide (reference number 172 in FIG. 3) represents a repositioning carrier which transfers the car along the rail from a first repositioning position in a first shaft into a second repositioning position in a second shaft. These modules are positioned on a story with the help of a frame (reference number 170 in FIG. 3). However, this modular arrangement is extremely limited in terms of variability. In addition, the frame must be positioned extremely accurately when fitting.

The problem addressed by the present invention is that of developing an elevator system of the kind referred to above.

The patent application PCT/EP2018/050265 published subsequently discloses a multi-car elevator system. A repositioning assembly is formed by a rotatable rail segment. The elevator system has an adjusting assembly for adjustment of the rotational axis.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to elevator systems in which a plurality of cars can travel simultaneously in a shared shaft, or in a plurality of shafts, and with the help of a repositioning assembly, the cars can be transferred from a first shaft into a second shaft The advantage of the elevator system according to the invention is, in particular, that the repositioning assembly can be fitted with quite rough tolerances. The adjusting assembly can be used to adjust the fitted repositioning assembly in such a manner that the cars are arranged as accurately as possible in the respective target shaft during operation following the repositioning process. Deformations during operation can make it necessary for the orientation of the repositioning assembly to be readjusted in this case.

Unlike in the case of the elevator system in PCT/EP2018/050265, the car is not mounted in a rucksack-type manner during vertical travel.

In particular, the car comprises guide rollers which are attached to opposite sides of the car.

In particular, the repositioning assembly has no rotatable rail segments.

The advantages mentioned in relation to the device or the method and other possible embodiments can easily be applied to the method or the device.

Figure 1:
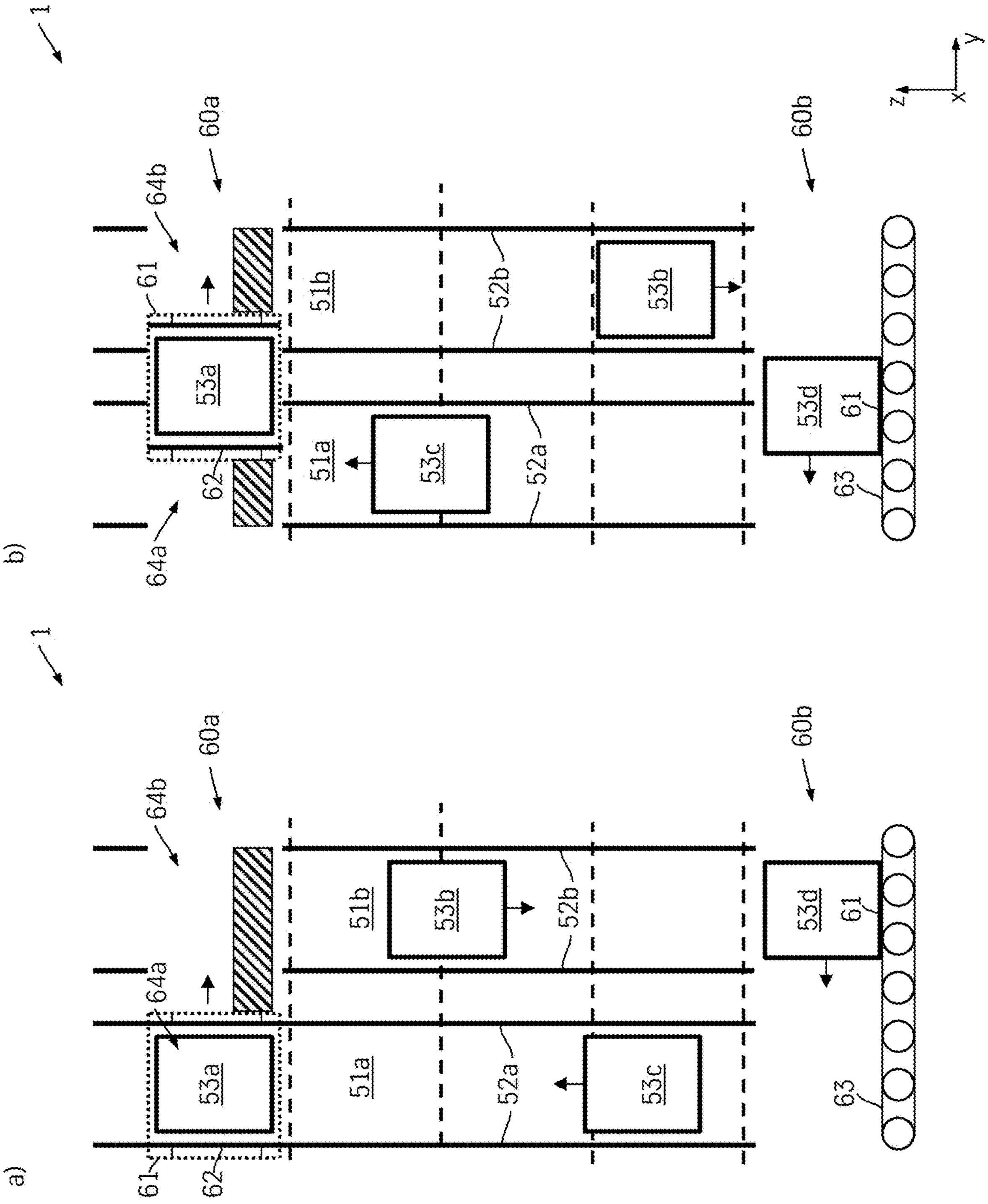
FIG. 1*a*) is a front schematic view of a basic design of an embodiment of an elevator system of the present disclosure having two repositioning assemblies.
FIG. 1*b*) is a front schematic view of a basic design of the elevator system of FIG. 1*a*) in which an elevator car is being moved from a first shaft into a second shaft by an upper repositioning assembly.

FIG. 1 shows parts of an elevator system 1 according to the invention. The elevator assembly 1 comprises fixed guide rails 52 along which cars 53 can be guided in a vertical direction. The first vertical guide rails 52*a* in this case are arranged in a first shaft 51*a* and second guide rails 52*b* are arranged in a second shaft 51*b*. The elevator system in this case comprises a plurality of cars 53*a*, 53*b*, 53*c*, 53*d*, wherein more than two cars can, in particular, travel simultaneously in one shaft.

The elevator system 1 comprises multiple repositioning assemblies 60*a*, 60*b*. With the help of a repositioning assembly 60 of this kind, a car can be repositioned from one shaft into the other shaft.

A repositioning process of the car 53*a* from the first shaft 51*a* into the second shaft 51*b* with the help of the upper repositioning assembly 60*a* is looked at by way of example. For this purpose, the car 53*a* runs along the vertical guide rails 52*a* vertically into the repositioning assembly 60*a*. The car 53*a* is then located in the first repositioning position 64*a*. From this repositioning position 64*a*, the car 53 could, on the one hand, continue to travel on vertically into the next story along the vertical guide rails 52*a*. On the other hand, the car 53*a* can also be transferred into a second repositioning position 64*b* in which said car is then arranged in the second shaft 51*b*.

For this purpose, the repositioning assembly 60*a* has a repositioning frame 61 which is likewise located in the first repositioning position 64*a*. If both the repositioning frame 61 and the car 53*a* are located in the first repositioning position 64*a*, the repositioning frame 61 can receive the car 53*a*.

A rail portion 62 of the vertical guide rail 52 can be separated from the remainder of the guide rail 52 in this case and fixedly connected to the repositioning frame 61. By being introduced into the first repositioning position 64*a*, the car 53*a* then reaches the guiding region of the rail portion 62. If the repositioning frame 61 then moves horizontally, this rail portion 62 is moved along with the car 53 guided on the rail portion 62 together with the repositioning frame 61. The repositioning frame 61 is then moved from the first repositioning position 64*a* into the second repositioning position 64*b* along a repositioning track 63. The repositioning track 63 may be a horizontal rail on which the repositioning frame 61 is guided. This repositioning principle is basically described in EP 3 318 526 A1.

Figure 3:
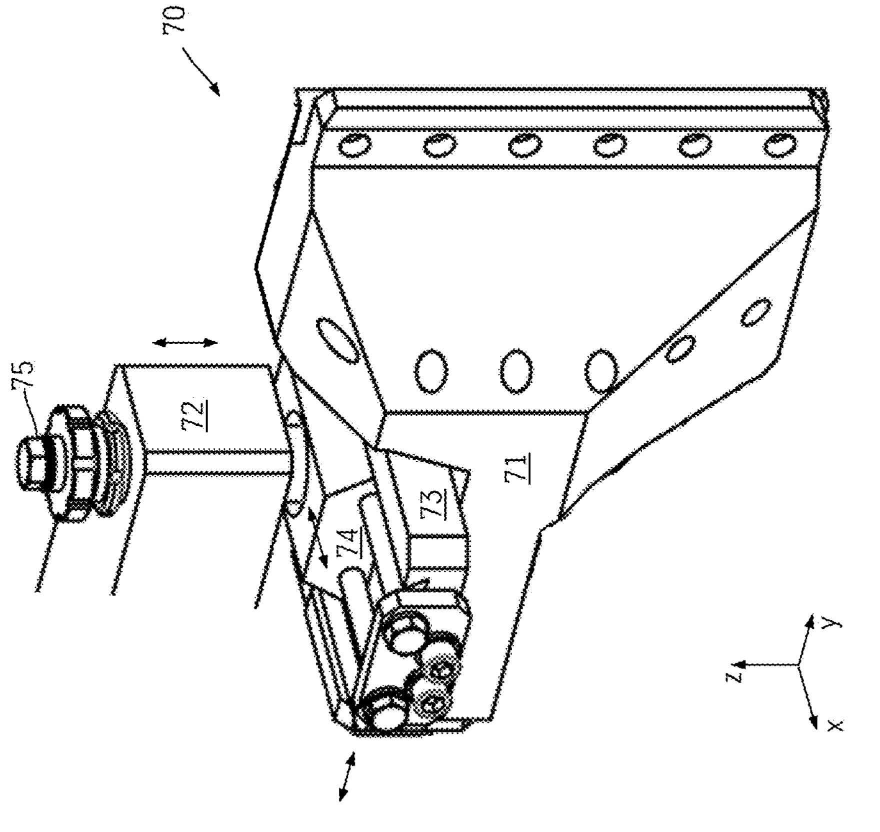
FIG. 3 is an perspective view of an embodiment of an adjusting assembly of the present disclosure, as disclosed herein.

FIG. 3 shows a possible embodiment of an exemplary adjusting device 70. The adjusting device 70 comprises an adjustment base 71 which can be fastened in a predefined position on the shaft wall 54, for example. An adjusting support 72 is fastened to the repositioning track 63 in a predefined position. The adjusting support 72 may also be an integral part of the repositioning track 63. The relative position of the adjusting support 16 in relation to the respective adjustment base 12 defines the position of the repositioning track, at least in a locally limited manner.

An adjusting rail 73 is held on the adjustment base 71 such as to be displaceable in the y-direction. An adjusting slide 74 is held on the adjusting rail 13 such as to be displaceable in the x-direction. An adjusting screw 75 is fitted to the adjusting slide 74 from above. The adjusting screw 75 is guided through a threaded bore in the adjusting support 72. The directions of the individual adjusting means need not necessarily correlate with the spatial directions x, y, z.

As shown at the connection between the adjusting rail 73 and the adjusting slide 74, displaceability can be achieved by means of a dovetail guide. There is also a dovetail guide of this kind between the adjustment base 71 and the adjusting rail 73, but it cannot be seen in this representation. By turning the adjusting screw 75, the adjusting support 72 can be raised or lowered in the z-direction in relation to the adjusting slide 74. The adjusted relative position of the adjusting support 72 in relation to the adjustment base 71 is fixed following adjustment.

Figure 5:
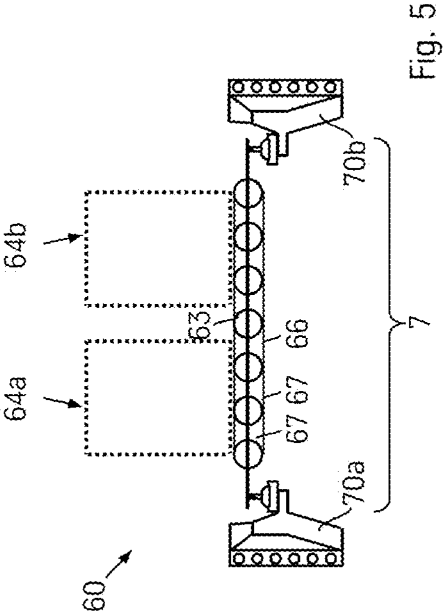
FIG. 5 is a front schematic view of a second embodiment of two adjusting assemblies used in connection with a second embodiment of a repositioning assembly, as disclosed herein.

Alternatively, the repositioning assembly may also comprise a conveyor belt assembly 60*b*, as illustrated in FIG. 5. An assembly of this kind can be used on a lower repositioning assembly in particular. The conveyor belt assembly 60*b* comprises a conveyor belt 66, wherein the elevator cage 52*b* being repositioned is placed on this conveyor belt. The region of the conveyor belt on which the car is mounted is regarded as the repositioning carrier 61. The conveyor belt 66, and with it the repositioning carrier 61, is guided with the help of bearing rollers 67. The repositioning track 63 is defined by the arrangement and orientation of the bearing rollers. The bearing rollers are oriented by the adjusting assembly 7 in a similar way to the preceding embodiment. The repositioning positions 64*a*, 64*b* are thereby adjusted.

It is not necessary for rail portions 62 to be repositioned with the car 53 in the conveyor belt embodiment. Otherwise, the method of operation is identical to the previously described embodiment with the repositioning frame.

The adjustment can be carried out once during commissioning. There is no need for continuous adjustment during routine operation. Checks that the orientation is correct can be made during routine maintenance work.

Figure 2:
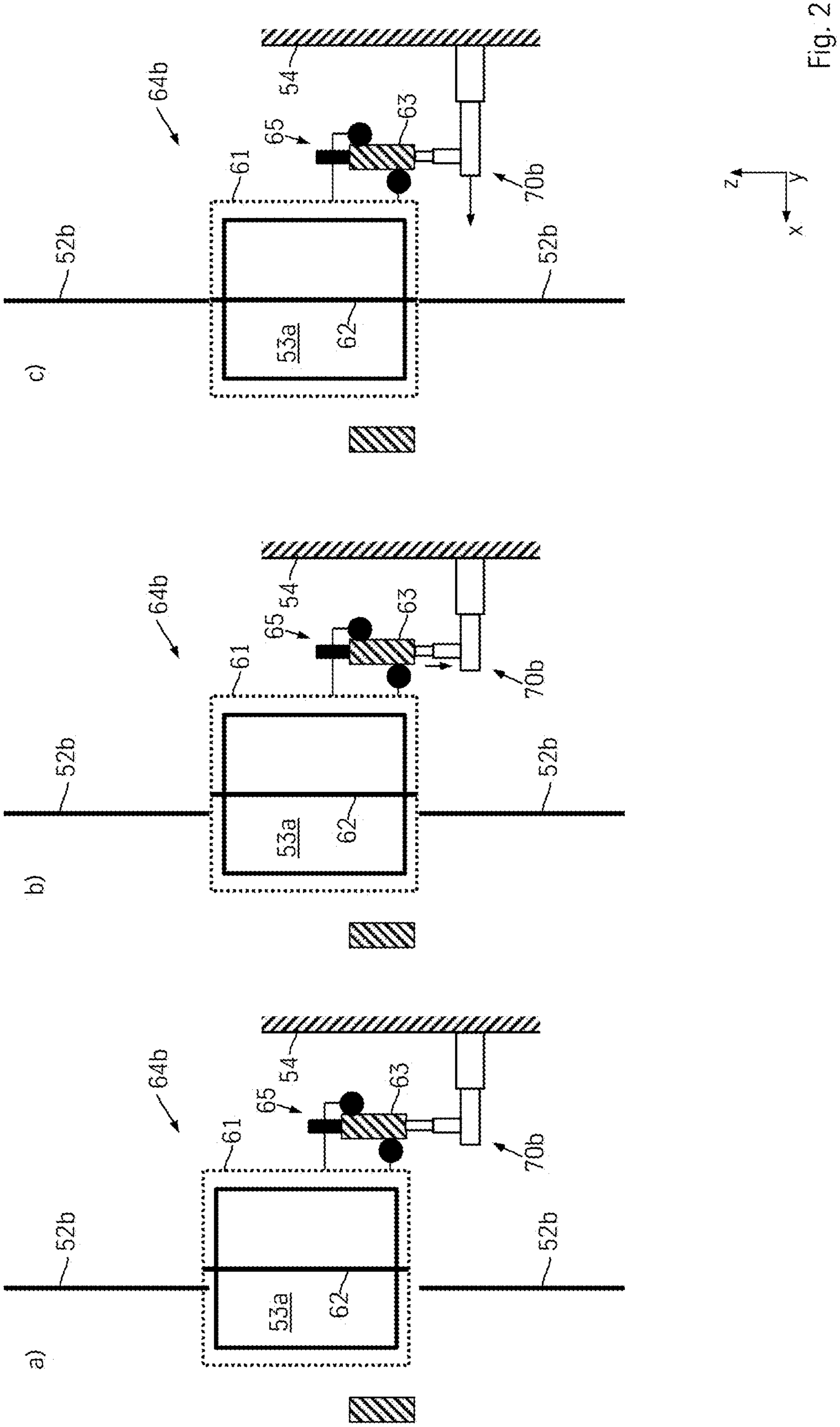
FIG. 2*a*) is a side schematic view of an embodiment of a repositioning assembly of the present disclosure in a first position, in which the rail portion that was moved with the elevator car from the first shaft to the second shaft is unaligned either horizontally or vertically with the vertical guiderail in the second shaft.
FIG. 2*b*) is a side schematic view of the repositioning assembly of FIG. 2*a* located in a second position, in which the rail portion that was moved with the elevator car has been brought into vertical alignment, but not horizontal alignment, with the vertical guiderail in the second shaft.
FIG. 2*c*) is a side schematic view of the repositioning assembly of FIGS. 2*a* and 2*b* located in a third position, in which the rail portion that was moved with the elevator car has been brought into both vertical and horizontal alignment with the vertical guiderail in the second shaft.
Figure 4:
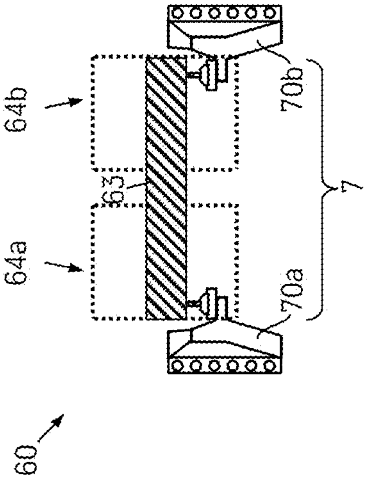
FIG. 4 is a front schematic view of a first embodiment of two adjusting assemblies used in connection with a first embodiment of a repositioning assembly, as disclosed herein.

As FIG. 2 shows, the repositioning carrier is guided on the repositioning track 63 with the help of a roller guide 65. The repositioning track in this case can be formed by a horizontal rail, wherein there may also be a rail of this kind on the other side. The repositioning track 63 is held on the shaft wall 54 by means of multiple adjusting devices 70 (see also FIG. 4).

An adjusting process is illustrated in FIG. 2 with the help of the first adjusting assembly 60*a*. In this case, FIG. 2*a* shows the repositioning carrier 61 along with the car 53*a* in the second, as yet unaligned, repositioning position 64*b*. It can be seen that the rail portion 62, which has been moved along with the car 53*a* from the first repositioning position into the second repositioning position, is not aligned with the vertical guide rail 52*b* in the second shaft. Referring to FIGS. 2*b* and 2*c*, with the help of the adjusting device 70*b*, there is a change in position of the repositioning track 63 in the region of the second repositioning position 64*b*, initially in the z-direction (see FIG. 2*b*) and then in the x-direction (see FIG. 2*c*). The rail portion 62 is then aligned at least in side view with the vertical guide rail 52 in the second repositioning position 64*b*. Alignment in the position in the X-direction can be achieved with the help of a limit stop (not shown) which may also be an integral part of the adjusting assembly. The guideway of the repositioning carrier 61 along the track 63 can be limited in a defined manner by the limit stop. The car 53 can then be moved vertically in the second shaft.

Figure 6:
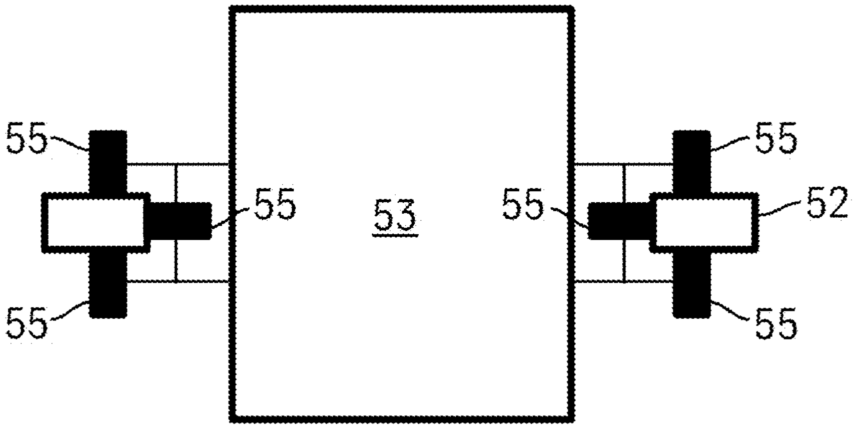
FIG. 6 is a top schematic view of an embodiment of an elevator cabin and the vertical guide rails on which the cabin rides, as disclosed herein.

FIG. 6 shows the bearing of the car during vertical travel. The car is guided with the help of guide rollers 55 on the at least two vertical guide rails 52. The at least two vertical guide rails 52 are arranged on opposite sides of the car 53.

LIST OF REFERENCE NUMBERS

1 elevator system
51 shaft
52 guide rails
53 car
54 shaft wall
55 guide rollers

60 repositioning assembly
61 repositioning frame
62 rail portion
63 repositioning track
64 repositioning position
65 roller guide
66 conveyor belt
67 bearing rollers
7 adjusting assembly
70 adjusting device
71 adjustment base
72 adjusting support
73 adjusting rail
74 adjusting slide
75 adjusting screw

What is claimed is:

1. An elevator system, comprising:

a first elevator shaft and a second elevator shaft;

a first vertical guide rail disposed in the first elevator shaft;

a second vertical guide rail disposed in the second elevator shaft;

a plurality of elevator cars movable within the first and second elevator shafts along the respective vertical guide rails;

a repositioning assembly in communication with said first elevator shaft and said second elevator shaft, the repositioning assembly comprising:

a repositioning track extending between the first elevator shaft and the second elevator shaft, and a repositioning carrier that is movable in a repositioning direction along the repositioning track, and configured to transfer the plurality of elevator cars from a first repositioning position in the first elevator shaft to a second repositioning position in the second elevator shaft; and an adjusting assembly configured to adjust a position of at least one of the first or second repositioning positions in a direction at least transversely to the repositioning direction, wherein the repositioning carrier is configured to receive each elevator car in the first repositioning position, move with the elevator car from the first repositioning position to the second repositioning position, and release the elevator car again in the second repositioning position.

2. The elevator system of claim 1, wherein the adjusting assembly is configured to adjust a position of at least one of the first or second repositioning positions at least one of horizontally transversely or vertically transversely to the repositioning direction.

3. The elevator system of claim 1, wherein the adjusting assembly is configured to adjust a position of the repositioning track, in a direction transverse to the repositioning direction, in the region of at least one of the first or second repositioning positions.

4. The elevator system of claim 1, wherein the repositioning carrier is a repositioning frame.

5. The elevator system of claim 1, wherein the repositioning carrier is formed by a portion of a conveyor belt.

6. The elevator system of claim 1, wherein the vertical guide rail includes a movable rail portion configured to be movable from the first repositioning position during the repositioning process.

7. The elevator system of claim 6, wherein the movable rail portion is configured to be moved together with the elevator car from the first repositioning position to the second repositioning position.

8. The elevator system of claim 6, wherein the movable rail portion is fixedly coupled to the repositioning carrier.

9. The elevator system of claim 1, wherein the adjusting assembly comprises a plurality of adjusting devices.

10. The elevator system of claim 9, wherein each adjusting device comprises:

an adjusting support attached to the repositioning assembly; and an adjustment base fastened in the first elevator shaft or the second elevator shaft, wherein the position of the adjusting support relative to the adjustment base is adjustable in at least three lateral degrees of freedom.

11. The elevator system of claim 1, wherein the first vertical guide rail and the second vertical guide rail each comprise at least two vertical guide rails arranged on opposite sides of each elevator car, the elevator system further comprising:

a plurality of guide rollers disposed on each elevator car that are configured to guide the elevator car by rolling along the at least two vertical guide rails on opposite sides of the elevator car simultaneously.

12. The elevator system of claim 1, wherein the repositioning assembly has no rotatable rail segments.

13. An elevator system, comprising:

a first elevator shaft and a second elevator shaft;

a first vertical guide rail disposed in the first elevator shaft;

a second vertical guide rail disposed in the second elevator shaft;

a plurality of elevator cars movable within the first and second elevator shafts along the respective vertical guide rails;

a repositioning assembly in communication with said first elevator shaft and said second elevator shaft, the repositioning assembly comprising:

a repositioning track extending between the first elevator shaft and the second elevator shaft, and a repositioning carrier that is movable in a repositioning direction along the repositioning track, and configured to transfer the plurality of elevator cars from a first repositioning position in the first elevator shaft to a second repositioning position in the second elevator shaft; and an adjusting assembly configured to adjust a position of at least one of the first or second repositioning positions in a direction at least transversely to the repositioning direction, wherein the repositioning carrier is formed by a portion of a conveyor belt.

14. The elevator system of claim 13, wherein the adjusting assembly is configured to adjust a position of at least one of the first or second repositioning positions at least one of horizontally transversely or vertically transversely to the repositioning direction.

15. The elevator system of claim 13, wherein the adjusting assembly is configured to adjust a position of the repositioning track, in a direction transverse to the repositioning direction, in the region of at least one of the first or second repositioning positions.

16. The elevator system of claim 13, wherein the repositioning carrier is a repositioning frame.

17. The elevator system of claim 13, wherein the vertical guide rail includes a movable rail portion configured to be movable from the first repositioning position during the repositioning process.

18. The elevator system of claim 17, wherein:

the movable rail portion is configured to be moved together with the elevator car from the first repositioning position to the second repositioning position; or the movable rail portion is fixedly coupled to the repositioning carrier.

19. The elevator system of claim 13, wherein the adjusting assembly comprises a plurality of adjusting devices.

20. An elevator system, comprising:

a first elevator shaft and a second elevator shaft;

a first vertical guide rail disposed in the first elevator shaft;

a second vertical guide rail disposed in the second elevator shaft;

a plurality of elevator cars movable within the first and second elevator shafts along the respective vertical guide rails;

a repositioning assembly in communication with said first elevator shaft and said elevator second shaft, the repositioning assembly comprising:

a repositioning track extending between the first elevator shaft and the second elevator shaft, and a repositioning carrier that is movable in a repositioning direction along the repositioning track, and configured to transfer the plurality of elevator cars from a first repositioning position in the first elevator shaft to a second repositioning position in the second elevator shaft; and an adjusting assembly configured to adjust a position of at least one of the first or second repositioning positions in a direction at least transversely to the repositioning direction, wherein the repositioning assembly has no rotatable rail segments.

* * * * *